United States Patent
Gerodolle et al.

(10) Patent No.: US 11,212,160 B2
(45) Date of Patent: Dec. 28, 2021

(54) REMOTE CONTROL OF EQUIPMENT

(71) Applicant: ORANGE, Issy-les-Moulineaux (FR)

(72) Inventors: Anne Gerodolle, Eybens (FR); Marc Douet, Voreppe (FR); Regine Basset, Crolles (FR)

(73) Assignee: ORANGE, Issy-les-Moulineaux (FR)

( * ) Notice: Subject to any disclaimer, the term of this patent is extended or adjusted under 35 U.S.C. 154(b) by 7 days.

(21) Appl. No.: 16/302,297

(22) PCT Filed: May 12, 2017

(86) PCT No.: PCT/FR2017/051151
§ 371 (c)(1),
(2) Date: Jan. 8, 2019

(87) PCT Pub. No.: WO2017/198932
PCT Pub. Date: Nov. 23, 2017

(65) Prior Publication Data
US 2019/0280912 A1 Sep. 12, 2019

(30) Foreign Application Priority Data
May 17, 2016 (FR) ...................................... 1654354

(51) Int. Cl.
*G06F 15/16* (2006.01)
*H04L 12/24* (2006.01)
(Continued)

(52) U.S. Cl.
CPC ...... *H04L 41/0266* (2013.01); *H04L 12/2818* (2013.01); *H04L 12/2898* (2013.01);
(Continued)

(58) Field of Classification Search
CPC ............. H04L 41/0213; H04L 61/2514; H04L 61/2567; H04L 61/2589; H04L 63/08
See application file for complete search history.

(56) References Cited

U.S. PATENT DOCUMENTS

| 2002/0115421 A1* | 8/2002 | Shahar | H04W 28/18 455/403 |
| 2012/0297087 A1 | 11/2012 | Humble et al. | |

(Continued)

OTHER PUBLICATIONS

French Search Report dated Jan. 13, 2017 for corresponding French Application No. 16/54,354, filed May 17, 2016.
(Continued)

*Primary Examiner* — Brian Whipple
*Assistant Examiner* — Gregory P Tolchinsky
(74) *Attorney, Agent, or Firm* — David D. Brush; Westman, Champlin & Koehler, P.A.

(57) ABSTRACT

A method for controlling selection of a communication method between an equipment control device belonging to a wide-area communication network and equipment belonging to a local communication network. The method includes the following steps relating to the control device: requesting the equipment to initiate a connection to the control device, the request being sent at the time of a routine connection of the equipment to the control device; determining whether the equipment can be reached by the control device using a direct method; and configuring the equipment if the equipment cannot be reached using a direct method.

18 Claims, 3 Drawing Sheets

(51) Int. Cl.
*H04L 12/28* (2006.01)
*H04L 29/12* (2006.01)

(52) U.S. Cl.
CPC ...... *H04L 41/0213* (2013.01); *H04L 41/0273* (2013.01); *H04L 41/0803* (2013.01); *H04L 41/0886* (2013.01); *H04L 61/2553* (2013.01); *H04L 61/2575* (2013.01); *H04L 41/0233* (2013.01); *H04L 61/2567* (2013.01)

(56) References Cited

U.S. PATENT DOCUMENTS

| | | | |
|---|---|---|---|
| 2013/0128729 A1* | 5/2013 | Nair | H04L 41/069 370/229 |
| 2013/0311656 A1* | 11/2013 | Liekens | H04L 41/046 709/224 |
| 2015/0074245 A1* | 3/2015 | Ma | H04L 67/32 709/220 |
| 2018/0013606 A1* | 1/2018 | Wang | H04L 29/06 |

OTHER PUBLICATIONS

French Written Opinion dated Jan. 13, 2017 for corresponding French Application No. 16/54,354, filed May 17, 2016.
International Search Report dated Jun. 22, 2017 for corresponding International Application No. PCT/FR2017/051151, filed May 12, 2017.
English translation of the International Written Opinion dated Nov. 20, 2018 for corresponding International Application No. PCT/FR2017/051151, filed May 12, 2017.
Broadband Forum, "TR-069, CPE WAN Management Protocol, Issue 1, Amendment 5, Issue Date: Nov. 2013, CWMP Version: 1.4", found at http://www.broadband-forum.org/technical/download/TR-069_Amendment-5.pdf.

* cited by examiner

REMOTE CONTROL OF EQUIPMENT

CROSS-REFERENCE TO RELATED APPLICATIONS

This application is a Section 371 National Stage Application of International Application No. PCT/FR2017/051151, filed May 12, 2017, the content of which is incorporated herein by reference in its entirety, and published as WO 2017/198932 on Nov. 23, 2017, not in English.

TECHNICAL FIELD

The invention relates to the general field of telecommunications.

It relates more particularly to the remote management and maintenance of equipment of a private communication network using a management server.

PRIOR ART

As part of their service offering, service providers such as telecommunications operators need to provide the clients thereof with specific equipment suited to the services thereof. For example, this is equipment (also called devices) located at a client site, also called CPE, meaning "customer premises equipment", and generally connected to a wide area communication network, such as the Internet, by means of a service gateway. This equipment installed at the premises of the clients is generally connected to a local area network (for example a home area network or a corporate network). Such equipment is, for example, digital set-top decoder boxes (set-top box in English), videotelephony or voice over IP (VoIP) terminals, mobile terminals, etc. In the context of a home systems network, it can also be household appliances, alarm systems, sensors, etc.

The service provider generally controls and maintains the various equipment placed thereby at the premises of the clients. This control particularly relates to the activation, configuration, updating, etc., of the equipment and associated services.

To carry out this control, or management remotely, many service providers use, for example, the CWMP meaning CPE WAN Management Protocol) standardized protocol, also called "TR-069" and published by the international "Broadband Forum". The most recent specification of this protocol is Amendment 5, which can be found at http://www.broadband-forum.org/technical/download/TR-069_Amendment-5.pdf.

Alternatively, any other management protocol presenting the same problems and offering the same capabilities could be envisaged within the context of this invention.

The protocol offers the service provider a group of services for controlling equipment comprising management, monitoring, setting parameters, tracking performance and diagnostics, etc., while meeting requirements for security, scalability and independence with respect to the equipment manufacturer. The CWMP protocol is based on the HTTP (HyperText Transfer Protocol) or HTTPS (HTTP Secure) transfer protocol, and on the SOAP (Simple Object Access Protocol) protocol. It allows communication between a remote device or auto-configuration server (ACS) and equipment of the local area network during sessions initiated by the latter. These sessions can be initiated for different reasons (first connection of the equipment to an ACS, boot or reboot, etc.) and also according to a period which can be determined by the ACS. However, a so-called session establishing request mechanism, or "Connection Request" in English, is provided by the protocol to allow the ACS server to asynchronously open a session with the equipment. In the case of equipment located behind a network address translation (NAT) system, for example in a local area network managed by a service gateway, the "Connection Request" mechanism is not however generally applicable since the address that the equipment has for itself is not an address that is accessible from the ACS. Likewise, a firewall can prevent access to the equipment.

Solutions exist for this problem.

Annex G of the CWMP protocol defines, for example, a mechanism for reaching equipment connected behind an NAT entity. This mechanism is based on the STUN (Simple Transversal of UDP through NATs) protocol and on the UDP (User Datagram Protocol) protocol. It provides for keeping a connection open with a STUN server by sending periodic messages to this server, this connection then being used by the ACS server in order to contact the CPE.

The mechanism provided in Annex K of the CWMP protocol, based on the XMPP (Extensible Messaging and Presence Protocol) protocol, proposes another solution for contacting equipment which is located behind a gateway or an NAT. This mechanism does not assume that the gateway itself supports the XMPP protocol, but rather the equipment in question (CPE and ACS) does so. However, the CPE must constantly maintain a valid connection to a server, which is restrictive and monopolizes resources.

Hereafter, "indirect" refers to such solutions which require the presence of specific modules at the equipment (for example a STUN client) and at the ACS server of the service provider (for example a STUN server) and which are based on maintaining a constant connection between the equipment and a server (for example the STUN server in the case of STUN, or the XMPP server in the case of XMPP), which presents disadvantages when many pieces of equipment must be controlled, particularly in terms of server sizing and required bandwidth.

The invention reduces the disadvantages of the prior art.

SUMMARY

To this end, according to a functional aspect, the object of the invention is a method for controlling the selection of an approach for communication between an equipment control device belonging to a wide area communication network and equipment belonging to a local area communication network, the method comprising, on the control device:
  a step for requesting the equipment to initiate a connection to the control device, said request being sent during a routine connection of the equipment to the control device;
  a test step to determine whether the equipment can be reached by the control device using a direct approach;
  a step of configuring the equipment if said equipment cannot be reached using a direct approach.

"Direct approach" means a communication approach by which the control device can reach the equipment without any intermediary other than the equipment of the network and can exchange data directly over this address (for example a uniform resource locator—URL). In this case, the equipment is said to be "directly reachable".

The invention offers the advantage of being able to test whether the equipment can be reached directly. If not, it is useful to configure it for another approach, which will make it possible to overcome the disadvantages inherent in not being able to reach the CPE directly. These approaches can however be resource-intensive. The invention makes it possible to not mobilize these resources unnecessarily if the CPE can be reached directly.

According to a specific embodiment of the invention, in a method as described above, the equipment can be reached by the control device using an indirect approach and the configuration step is a step for setting the parameters of and activating the indirect approach.

When the equipment cannot be reached directly, it is said to be "directly unreachable", for example because it is located behind a gateway, a firewall, etc. In this case, it is possible to resort to a so-called "indirect" approach using the additional services of software and/or hardware modules which make it possible to access the equipment (additional servers for example of STUN or XMPP type, software module on the gateway and/or the equipment, etc.). These approaches can be resource-intensive, particularly when many pieces of equipment must be controlled, in terms of server sizing and the required bandwidth.

Advantageously, this embodiment makes it possible to always reach the CPE by avoiding the use of the indirect approach if it is not necessary. Examples for parameter setting are described in TR-069 for XMPP/STUN.

According to a second specific embodiment of the invention, which will be able to be implemented alternatively or in combination with the previous embodiment, in a method as described above, the configuration step consists in activating a periodic connection mode and setting the parameters for the frequency thereof.

The sessions between the CPE and the ACS can be initiated over a period which can be determined by the ACS. Advantageously, this embodiment of the invention makes it possible to set (particularly to increase) the frequency of the periodic connection of the directly unreachable equipment, in order to suit the control requirements, providing a delay compatible with the constraints of the service provider, while avoiding applying this setting to the equipment that can be directly reached. As a result, the load of the management server is reduced.

According to a third specific embodiment of the invention, which will be able to be implemented alternatively or in combination with the previous embodiments, a method as described above includes a step of initializing a first time period and the step for configuring the equipment is carried out only if said first time period has elapsed.

Advantageously, according to this embodiment, a time period (time out in English) is used to decide the reachability of the equipment.

According to an alternative of this third specific embodiment of the invention, in a method as described above, the test step for determining if the equipment can be reached using a direct approach is followed by the following steps, so long as the first time period has not elapsed:
  waiting for a second predetermined time period;
  sending a request to the equipment.
This mode of implementing the invention advantageously makes it possible to keep the session open by preventing the premature closure thereof at the request of the CPE before the end of the first time period. The second time period makes it possible to space out the requests sent to the equipment in order to limit the number thereof.

According to an alternative, the request sent to the equipment is a neutral request.

Advantageously, according to this alternative, the request is "neutral", i.e. it does not modify the state of the CPE. It is a wait request with the sole aim of keeping the session open. For example, it can be a "GetRPCMethods" request in accordance with the TR-069 specification previously mentioned.

According to a fourth specific embodiment of the invention, which can be implemented alternatively or in combination with the previous embodiments, the step for requesting the equipment to initiate a connection is followed by:
  a step for sending a command for delayed connection of the equipment after a predetermined delay;
  a step for receiving a request for connection of the equipment after this delay;
the test step being carried out after receipt of said connection request.

This embodiment of the invention provides the same advantages as the previous embodiment. However, it does not use the mechanism for sending neutral requests.

According to a hardware aspect, the invention also relates to a system for controlling the selection of an approach for communication comprising:
  an equipment control device belonging to a wide area communication network;
  equipment belonging to a local area communication network;
said control device comprising:
  a module for requesting the equipment to initiate a connection to the control device, said request being sent during a routine connection of the equipment to the control device;
  a test module for determining whether the equipment can be reached by the control device using a direct approach;
  a module for configuring the equipment if said equipment cannot be reached using a direct approach.

The term module can correspond both to a software component and to a hardware component or a group of hardware and software components, a software component itself corresponding to one or more computer programs or sub-programs or more generally to any element of a program that can execute a function or a group of functions as described for the modules in question. In the same way, a hardware component corresponds to any element of a hardware group that can execute a function or a group of functions for the module in question (integrated circuit, chip card, memory card, etc.).

According to another hardware aspect, the invention also relates to a computer program that can be executed for selecting an approach for communication between an equipment control device and equipment belonging to a local area communication network as defined above, the program comprising code instructions which, when the program is run by a processor, carries out the steps of the control method that is defined above.

According to yet another hardware aspect, the invention relates to a recording medium that can be read by a data processor on which a program is recorded that comprises program code instructions for executing the steps of the method that is defined above.

The objects according to the hardware aspects of the invention offer at least the same advantages as those offered by the method according to the first aspect.

The optional features stated for the first aspect can apply to the hardware aspects in terms of method.

The invention will be better understood upon reading the following description, given by way of example and with reference to the appended drawings.

THE FIGURES

Figure 3:
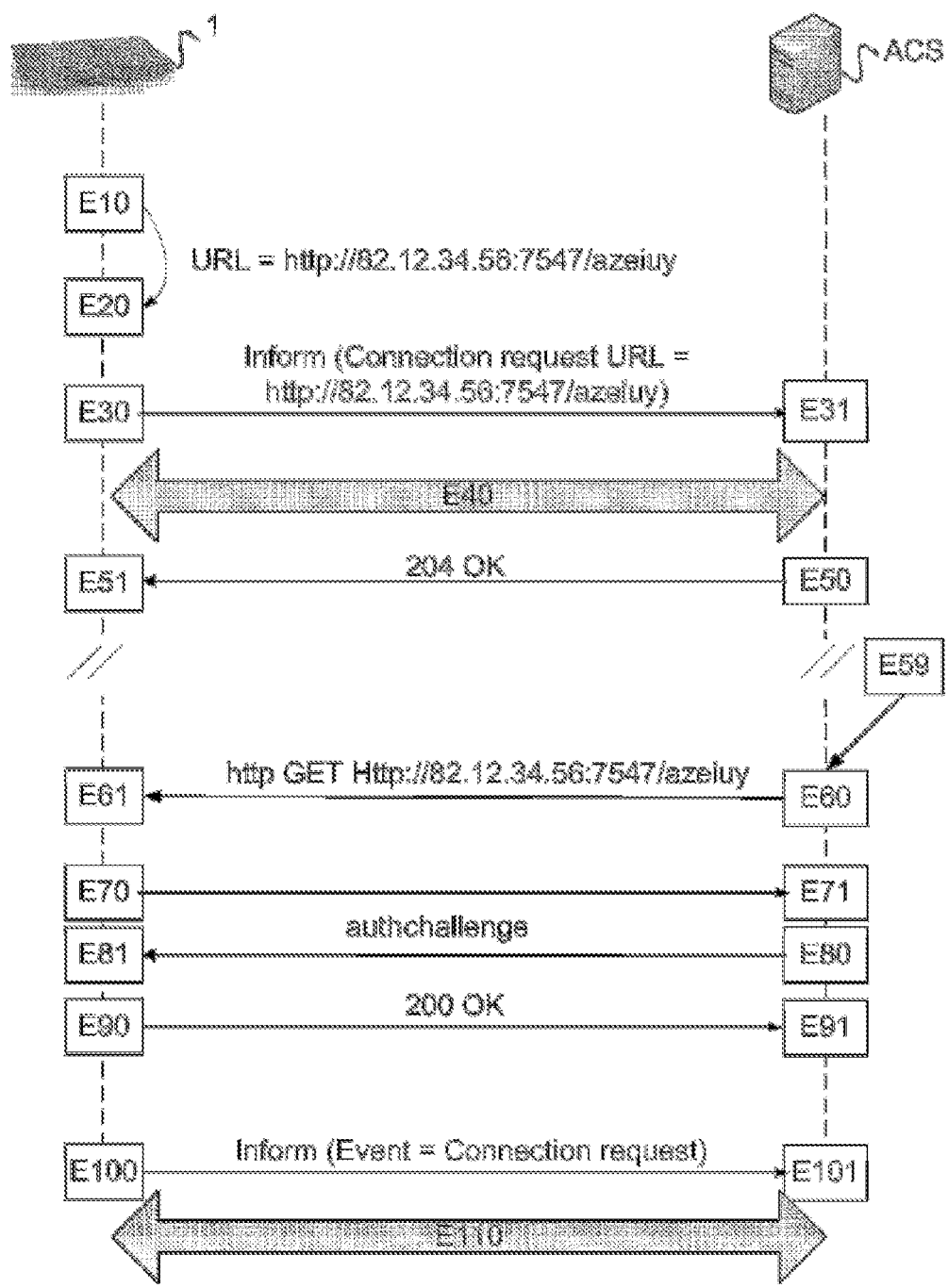
Figure 4:
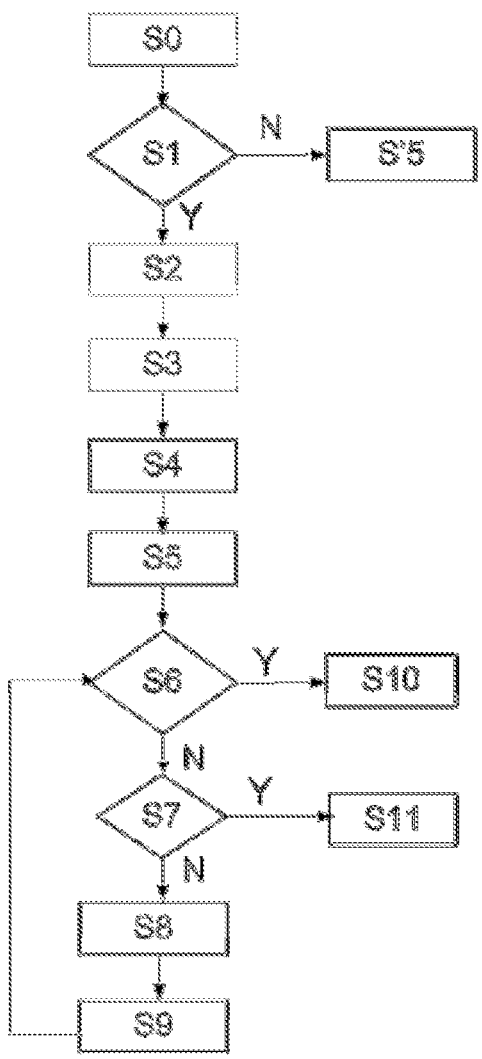
Figure 5:
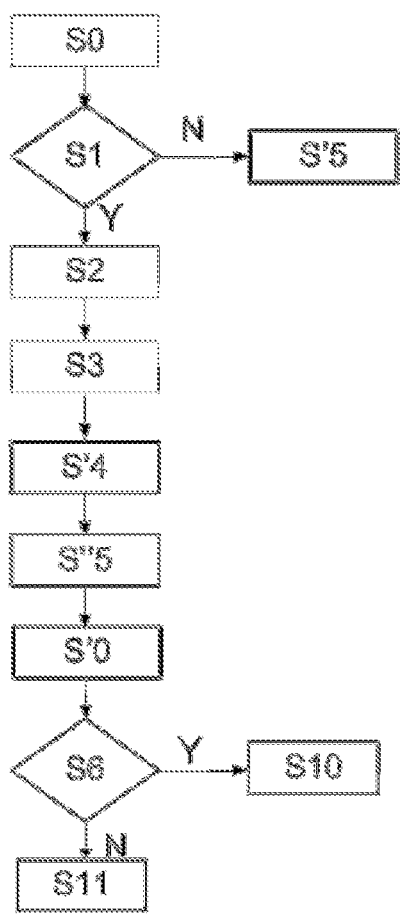

FIG. 3 recalls the steps of the "Connection Request" mechanism provided by the CWMP protocol;

FIG. 4 shows a flow diagram illustrating the various steps of the method according to an embodiment of the invention;

FIG. 5 shows a flow diagram illustrating the various steps of the method according to another embodiment of the invention.

DETAILED DESCRIPTION OF AN EXEMPLARY EMBODIMENT ILLUSTRATING THE INVENTION

Figure 1:
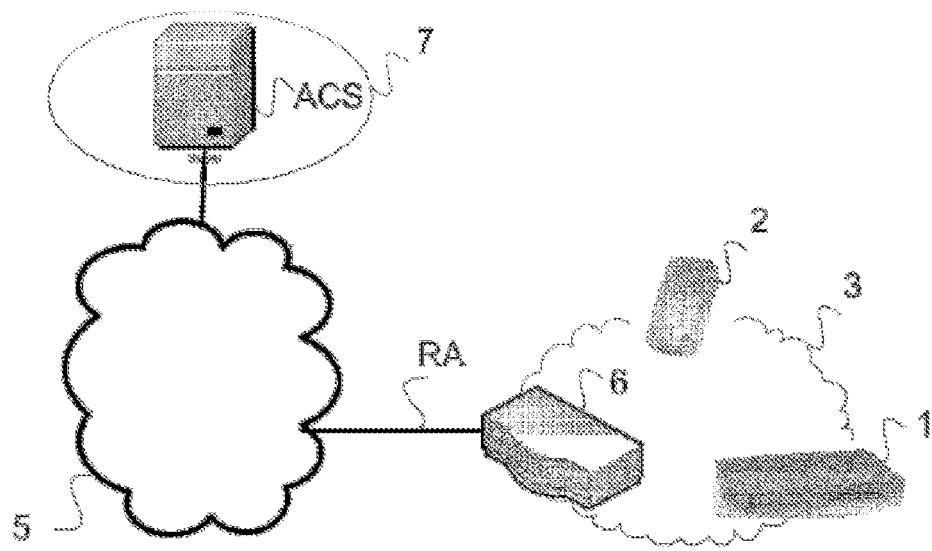
FIG. 1 shows a remote management system for a local area network in a communication network.

FIG. 1 shows a local area network 3 remotely managed by a management system (7). For the environment shown in FIG. 1, a local area communication network means a LAN ("Local Area Network") type network. This network can be, in particular, a home area network or a corporate network. A service gateway (6) is arranged to provide equipment of the local area network 3 with access to the wide area communication network (5) (for example the Internet), via an access network symbolized in this case by the link RA. The IP (meaning "Internet Protocol") protocol is used by the equipment in the local area network to communicate with one another and also to communicate with the wide area communication network.

The local area network 3 can comprise a wired network, for example of ethernet type according to the IEEE 802.3 standard, a wireless network, for example of Wi-Fi type, according to the IEEE 802.11 standard, or even a power line communication PLC network. No limitation is placed on the type and support of the local area network.

The equipment, also called CPE, of the local area network 3 can be any type of equipment, for example domestic, having a connection to the local area network. For example, it can be a connected radio set, a wired phone, a connected television, a set-top box, a games console, household devices, etc. FIG. 3 shows, by way of example, an STB (1) and a power line communication adapter (PLC, 2).

The equipment (1, 2) of the local area network 3 has an address that is specific thereto. The gateway 6 can contain a network address translation system or a firewall limiting the access of the public network to this local area network. Likewise, it will be noted that the gateway 6 can itself become unreachable when equipment upstream in the network 5 undertakes filtering or an address translation. In this case, the mechanisms implemented in the invention can apply to the gateway itself.

The management system (7) groups together a plurality of equipment allowing the operator of the communication network to manage and monitor equipment, particularly belonging to local area networks. The management system 7 particularly comprises a management server also called an auto-configuration server ACS, but also other devices not shown such as, for example, a call system and operational support systems (OSS) or business support systems (BSS).

In the embodiment described, the management of the equipment and of the gateway 6 of the local area communication network 3 is carried out remotely by the management server ACS, located outside the local area network 3 and communicating with the equipment of the local area network 3 by means of an access network and the gateway 6. In this example, the management server engages in dialog with the equipment (1, 2) of the local area network 3 for the management thereof according to the remote control protocol CWMP ("CPE WAN Management Protocol") defined in the technical report TR-069 produced by the Broadband Forum and introduced above.

Using the CWMP protocol, given in this case by way of nonlimiting example, the management equipment can particularly:

remotely attain and control a state of the equipment that is connected to the local area network 3;
initiate diagnostic tests on the equipment;
download software or microcode files;
control events;
etc.

The technical report TR-069 envisages equipment (1, 2) of the local area network 3 establishing, under certain conditions, a connection to the management server ACS. During this procedure, the equipment (1, 2) of the local area network 3 transmits various items of management data relating thereto. The management data received during this procedure, called "Inform RPC", are stored for example in a database (not shown) and then allow the management server ACS to carry out various tasks for controlling the equipment. The management data particularly comprise connection data corresponding to a uniform resource locator (or URL) denoted ConnectionRequestURL, provided to allow the management server ACS to transmit, to the equipment of the local area network, a request to connect to this address via the HTTP protocol. This connection request makes it possible to initiate the establishment of a communication session between the equipment to be managed and the ACS server thereof.

It is highlighted in this case that, in the specific case of the equipment 1, 2 of the local area network 3, the connection data, i.e. the uniform resource locator ConnectionRequestURL, can correspond to the URL of equipment which cannot be accessed from outside the local area network. As mentioned above, the gateway 6 itself can be inaccessible due to an element located upstream in the network 5.

Figure 2:
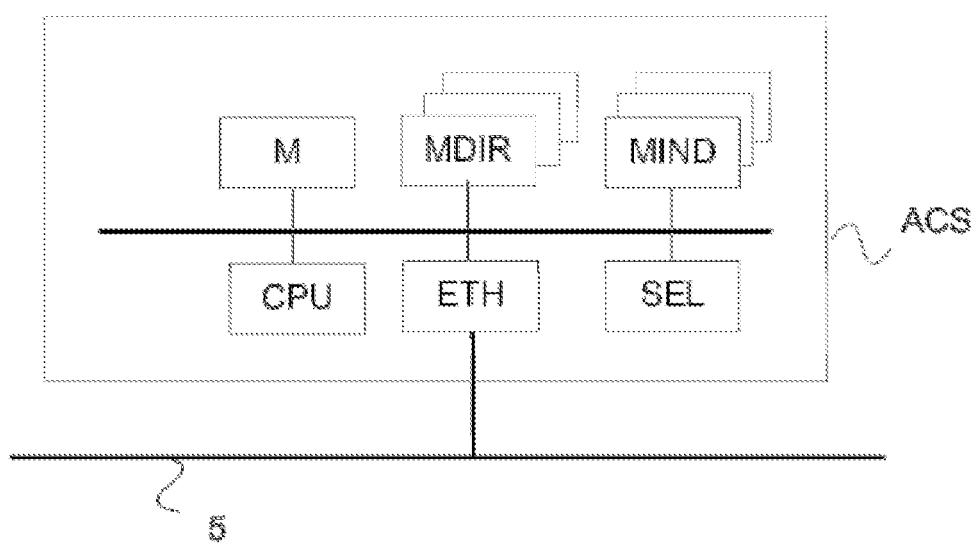
FIG. 2 shows the hardware architecture of a management server according to an embodiment of the invention.

FIG. 2 schematically shows the hardware and software architecture of a management server according to an embodiment of the invention.

The server (ACS) conventionally comprises memories (M) associated with a processor (CPU). The memories can be of ROM (read-only memory in English) or RAM (random access memory in English) or Flash type. The server (ACS) communicates with the wide area network via the module ETH (ethernet) according to this example.

The device further includes a selection module (SEL) for an approach for communication chosen from the available direct approaches (MDIR) and indirect approaches (MIND) which can be used between the ACS and the CPE.

It is recalled that an indirect approach (MIND) is, for example, a communication module that can manage an XMPP (or STUN) communication with an XMPP (or STUN) server. A direct approach is, for example, a module which provides a "simple" communication using the CWMP protocol with equipment of the local area network that is directly accessible from the management server.

Other non-standardized direct or indirect approaches exist.

However, no solution exists that offers the advantages of the invention by making it possible to choose between a direct approach and an indirect approach.

FIG. 3 recalls the steps of the "Connection Request" mechanism according to the prior art provided by the CWMP protocol, which allows the ACS server to asynchronously open a session with the equipment.

Generally, during each boot of the equipment or CPE (step E10), the latter opens connection to a HTTP server using an address also called a URL (uniform resource locator) (step E20). This URL comprises the IP (Internet Protocol) address of the equipment and the port on which it can be reached in the local area network to which it belongs, in particular for implementing a "Connection Request" procedure as mentioned above. In the example used here, the URL is denoted: URL=http://82.12.34.56:7547/azeiuy.

Then, the CPE sends a http POST request containing a CWMP message of Inform type to the ACS server to which it is connected and which provides the control thereof, in other words the management thereof (step E30). In this message, the CPE indicates a certain number of parameters, particularly the URL of the HTTP server to which connection was opened in step E20, over which the ACS serer can contact it. This message is denoted symbolically in the figure as:

Inform (Connection request URL=http://82.12.34.56:7547/azeiuy)

It is noted that, when this URL is changed, the CPE must inform the ACS server such that the latter is always in possession of an updated URL.

There follows a dialog between the CPE and the ACS server in the session established in this manner (step E40), which terminates with a message 204 (OK) sent by the ACS server to the CPE (step E50).

It is now assumed that, later, during a step E59, the service provider requests an update operation on the CPE via the ACS server. The "Connection Request" mechanism provided by the CWMP protocol will be implemented. During a step E60, a GET-type http request is transmitted to the CPE using the URL provided previously thereby. In a known manner, in the HTTP protocol, the GET approach makes it possible to request a resource.

The CWMP protocol provides, in response to the request from the ACS server, authentication of the ACS server by the CPE (steps E70 to E90), during which the ACS server uses, for the authentication thereof, an identifier and a password previously shared between the CPE and the ACS server (step E80). A message 200 OK (or 204 in the absence of content) is transmitted by the CPE to the ACS server when the authentication is successful (E90).

If a message 200 or 204 is sent back by the CPE, the latter will have to then attempt to initiate a session with the ACS thereof. For this purpose, it sends an Inform message to the ACS server containing an event "Event=ConnectionRequest" (E100). Subsequently, the ACS server can remotely manage the CPE via the session established in this manner (E110) and request thereof various actions by means of RPC (Remote Procedure Call) commands for the updating thereof. For example, it can request it to download a configuration file, to return the value of one of the parameters thereof, etc.

In other words, according to this "Connection Request" mechanism, the ACS server requests a connection of the CPE by visiting a URL provided by the CPE. This basic mechanism therefore assumes that the CPE can be reached directly by the ACS server using the URL indicated in the Inform message. Therefore, it is not applicable when the CPE is located behind a network address translation NAT entity or behind a firewall protecting the local area network to which the CPE belongs (unless it is possible to take advantage of another direct solution such as that described in Appendix IV of the specification TR-069, Amendment 5).

As disclosed previously, there exists a certain number of solutions to this problem, particularly those specified in Annexes G (STUN) and K (XMPP) of the CWMP specification. However, these solutions require a connection to be maintained between the CPE and a server, which is restrictive and monopolizes hardware and software resources.

Two examples of a solution according to the invention, making it possible to free up these resources when they are not necessary, i.e. when the CPE which implements such an indirect approach can be reached directly, will now be described in support of FIGS. 4 and 5.

FIG. 4 shows a detailed flow diagram of a method according to an embodiment of the invention.

The invention is used particularly if the CPE can use an indirect approach, for example STUN or XMPP. As has been explained above, the use of such an approach requires a set of resources to be kept active, which resources can be saved by implementing the invention.

The general principle of this embodiment is as follows: when the equipment (CPE) starts a CWMP session with the ACS after a reboot or when it informs the ACS that the connection address thereof has changed, before terminating the session, the ACS checks if the indicated connection address can be used directly (using a direct approach). For this purpose, it begins by sending a GET request to the address provided by the equipment using the identifier and the password used during the "ConnectionRequest" mechanism. While it has not received a response, it keeps the session open for a predetermined time period (in this case called FEACHABILITY_TIMEOUT). If, before this predetermined time period has expired, the ACS receives a response to the GET request, it considers the equipment to be reachable. Therefore, it can prevent the activation, on the equipment, of an indirect approach such as XMPP or STUN, for sending a connection request. If, by contrast, the ACS does not receive a response before expiry of the predetermined time period, in this example it activates, on the equipment, the indirect approach that the latter implements. Subsequently, to send a connection request, the ACS will use either the direct approach or the indirect approach, depending on the decision taken during the previous step by the ACS selection module.

The flow diagram of FIG. 4 specifies these principles in a more detailed manner within the context of a specific embodiment of the invention. It links together the following steps S0 to S11 on the ACS:

During a step S0, the ACS conventionally receives (in accordance with steps E30/E31 described previously in support of FIG. 3) an Inform message; according to this example, the Inform message contains the connection address http://82.12.34.56:7547/azeiuy.

During the following step S1, the relevance of implementing the approach according to the invention is assessed. For this purpose, for example, if the CPE connects for the first time to the ACS, or if it reboots, or if the IP address thereof has changed, etc., this step is validated in order to move to step S2. Otherwise, it is considered that it is not necessary to implement steps S2 to S11 and the algorithm continues with a step S'5 similar to step S5 which will be described hereafter, during which the ACS can conventionally carry out management operations and terminate the session.

During the following step S2, the ACS extracts the connection information, i.e. in this case the address "URL=http://82.12.34.56:7547/azeiuy".

Then during a step S3, this address is used to transmit a request for establishing a control session to the CPE. This request is denoted in an abbreviated form in the diagram of FIG. 3 by:

request. URL (http GET http://82.12.34.56:7547/azeiuy)

During the following step S4, the ACS initiates a first time period (timer) denoted in this case as REACHABILITY_TIMEOUT; at the end of this time period, the ACS will be able to decide that the CPE is not reachable.

During a following step S5, a CWMP dialog can be established. The ACS can, for example, carry out management operations (configuring the CPE, updating the firmware, etc.) during this session.

During a step S6, the ACS tests if it has received a response to the connection request "Connection Request". If the connection with the CPE is successful, it receives a code 200 in accordance with step 90 described in figure (or 204 in the case of an empty response). If the CPE decides to not proceed with the request (since it is already in a session, or since it considers itself to be overloaded, etc.), it responds with a code 503, in accordance with the specification of the CWMP protocol. In the latter case, it will be noted that the CPE is active (it responds to the HTTP request) but will not contact the ACS via an Inform message.

If the ACS has received such a response to the prior GET request thereof, it considers that the equipment can be reached using a direct approach. Therefore, it can prevent the activation, on the equipment, of an indirect approach such as XMPP or STUN, for sending the connection request. The end of the dialog is then indicated during a step S10 (sending the code 204).

If, however, the ACS has not received a response to the GET request, there follows a step S7 during which it is tested if the delay (time period) REACHABILITY_TIMEOUT has elapsed.

If the result of this test is positive, i.e. if the delay has elapsed without having received a response from the CPE, the latter is considered to be directly unreachable; therefore, the ACS, during step S11, undertakes the required measures: for example for the establishment of an indirect approach, an XMPP or STUN configuration, or any other available technique. This configuration is followed by a dialog end message (204).

If the result of this test is negative, i.e. if the delay REACHABILITY_TIMEOUT has not yet elapsed, this can mean that the CPE can be reached but has not had the time to respond. A step S8 is therefore carried out during which the ACS waits for a second predetermined time period, in this case called "CPE_CONNECTION_TIMEOUT". This period takes account of the fact that, according to the standard, after having posted a message to the ACS, the equipment must keep the connection open for at least a predetermined time, currently defined as 30 seconds, before considering the ACS to be unreachable. In order to prevent the premature closure of the session by the CPE, the ACS therefore spaces apart the requests thereof by a delay less than the 30 second value proposed by the standard, for example 20 seconds (CPE_CONNECTION_TIMEOUT=20 seconds).

The ACS sends, to the equipment, during a step S9, a so-called "neutral" request (such as GetParameterNames, GetRPCMethods, etc., which are defined in the standard), i.e. intended solely for maintaining the session without any particular action on the CPE, such as to allow the latter the time to respond to the connection request (HTTP ConnectionRequest). The aim of this request is to keep the session open.

This step S9 is followed by a return to the already mentioned step S6.

FIG. 5 shows a flow diagram illustrating the various steps of the method according to another embodiment of the invention.

Steps S0 to S3 are identical to those of FIG. 4.

During the following step S'4, a CWMP dialog can be established. The ACS then sends, to the equipment, a command requesting it to initialize a new connection after a delay SCHEDULE_DELAY; at the end of this time period, it can be decided by the ACS that the CPE cannot be reached.

During a following step S"5, the ACS can, for example, carry out management operations (configuration of the CPE, updating the firmware, etc.) during this session. The ACS then terminates the session and awaits a new connection of the equipment.

During step S'0, the ACS receives a new Inform message corresponding to the request carried out in step S'4.

During a step S6, the ACS tests whether it has received a response to the connection request "Connection Request". If the ACS has received such a response to the prior GET request thereof, it considers that the equipment can be reached using a direct approach. Therefore, it can prevent the activation, on the equipment, of an indirect approach such as XMPP or STUN, for sending a connection request. The dialog end is then notified during a step S10 (sending the code 204).

If, however, the ACS has not received a response to the GET request, the equipment is considered to be directly unreachable; therefore, the ACS undertakes the required measures for establishing an indirect approach during step S11 identical to that of FIG. 4.

An alternative to this embodiment would consist in only sending the message containing the delay "SCHEDULE INFORM" if the CPE has not yet responded to the connection request. In this case, it can be advantageous to carry out, before S'4, the management operations described in step S"5 (with the exception of closing the session) in order to increase the chances of having response from the CPE.

The two embodiments described in support of FIGS. 4 and 5 differ in that, in a first case, all of the operations are carried out in one and the same session, which can require artificially sending "neutral" messages to the CPE in order to keep the session open for a time that is sufficient to be able to consider the CPE to be unreachable in the instance of no response, whereas in the second case (FIG. 5), the connection attempt and the reachability test are carried out during two sessions that follow one another but are spaced apart by a sufficient time gap.

Of course, the embodiments which have been described above have been given in a purely indicative manner that is in no way limiting, and many modifications can be easily made by a person skilled in the art without necessarily departing from the scope of the invention.

In particular, the test of step S1 of FIGS. 4 and 5, relating to the choice of implementing, or not, the algorithm of the invention, can be undertaken according to various combinable criteria: according to the events indicated by the CPE (implementing the algorithm on BOOTSTRAP and BOOT events), according to a time criterion (if the last implementation dates back more than ten days for example), or if a direct connection attempt has failed since the last implementation of the algorithm, etc.

It is also recalled that the invention is used not only for CWMP but also for any protocol in which equipment would be controlled that cannot necessarily be directly reached, in particular when it can implement indirect approaches in order to overcome this problem, though to the detriment of simplicity and the implementation cost.

The invention claimed is:

1. A method implemented on a control device adapted to control an equipment via a communication network during communication sessions initiated by connection of said equipment, the method comprising:
  receiving from the equipment, an information message initiating a first communication session between said control device and said equipment, said information message comprising a first address of said equipment;
  sending a first request, during said first communication session, using said first address, to the equipment to initiate a connection to the control device; and
  configuring the equipment to make the equipment accessible via said communication network to the control device in response to no connection initiating a second communication session with said equipment being received during a first time period starting after sending the first request,
  wherein the method further comprises, so long as the first time period has not elapsed:
    waiting fora connection for a second time period; and
    sending a second request to the equipment to initiate a communication session with the control device, wherein said second time period is lower than a third time period during which the equipment must keep the first communication session open after having posted the information message to the control device according to a protocol used by said control device.

2. The method as claimed in claim 1, wherein the configuring comprises setting parameters of and activating an indirect approach.

3. The method as claimed in claim 1, wherein the configuring comprises activating a periodic connection mode and setting parameters for a frequency thereof.

4. The method as claimed in claim 1, wherein the second request sent to the equipment is a neutral request, not modifying a state of the equipment.

5. The method of claim 1 wherein said second time period is lower than 30 seconds.

6. The method of claim 1 wherein sending said first request to the equipment for initiating a connection is followed by:
  sending a command for delaying connection of the equipment after a first delay; and
  receiving a request for connection of the equipment after this first delay;
and said first time period starts after receipt of said connection request.

7. A control device adapted to control an equipment via a communication network during communication sessions initiated by connection of said equipment, the control device comprising:
  a processor; and
  a non-transitory computer readable medium comprising instructions stored thereon which when execute by the processor configure the control device to perform acts comprising:
  receiving an information message from the equipment initiating a first communication session between said control device and said equipment, said information message comprising a first address of said equipment;
  during said first communication session, sending, using said first address, a first request to the equipment to initiate a connection to the control device;
  configuring the equipment to make the equipment accessible via said communication network to the control device, according to an approach for communication adapted to communication networks where said equipment is not accessible by using said first address from said control device, in response to no connection initiating a second communication session with said equipment being received during a first time period starting after sending the first request; and
  so long as the first time period has not elapsed:
    waiting for a connection for a second time period; and
    sending a second request to the equipment to initiate a communication session with the control device, wherein said second time period is lower than a third time period during which the equipment must keep the first communication session open after having posted the information message to the control device according to a protocol used by said control device.

8. The control device as claimed in claim 7, wherein the configuring comprises setting parameters of and activating an indirect approach.

9. The control device as claimed in claim 7, wherein configuring comprises activating a periodic connection mode and setting parameters for a frequency thereof.

10. The control device as claimed in claim 7, wherein the second request sent to the equipment is a neutral request, not modifying the state of the equipment.

11. The control device as claimed in claim 7 wherein said second time period is lower than 30 seconds.

12. The control device as claimed in claim 7, wherein sending said first request to the equipment for initiating a connection is followed by:
  sending a command for delaying connection of the equipment after a first delay; and
  receiving a request for connection of the equipment after this first delay;
and said first time period starts after receipt of said connection request.

13. A non-transitory computer readable medium comprising a computer program including code instructions stored thereon for implementing a method of controlling an equipment by a control device, when the instructions are executed by a processor of the control device, wherein the control device is adapted to control the equipment via a communication network during communication sessions initiated by connection of said equipment, and wherein the instructions configure the control equipment to:
  receive from the equipment, an information message initiating a first communication session between said control device and said equipment, said information message comprising a first address of said equipment;
  send a first request, during said first communication session, using said first address, to the equipment to initiate a connection to the control device;
  configure the equipment to make the equipment accessible via said communication network to the control device in response to no connection initiating a second communication session with said equipment being received during a first time period starting after sending the first request; and
  so long as the first time period has not elapsed:
    wait for a connection for a second time period; and
    send a second request to the equipment to initiate a communication session with the control device, wherein said second time period is lower than a third time period during which the equipment must keep the first communication session open after having posted the information message to the control device according to a protocol used by said control device.

14. The non-transitory computer readable medium as claimed in claim 13, wherein the second request sent to the equipment is a neutral request, not modifying the state of the equipment.

15. The non-transitory computer readable medium as claimed in claim 13, wherein sending said first request to the equipment for initiating a connection is followed by:
   sending a command for delaying connection of the equipment after a first delay; and
   receiving a request for connection of the equipment after this first delay;
and the first time period starts after receipt of said request for connection.

16. The non-transitory computer readable medium as claimed in claim 13, wherein said second time period is lower than 30 seconds.

17. The non-transitory computer readable medium as claimed in claim 13, the configuring comprises setting parameters of and activating an indirect approach.

18. The non-transitory computer readable medium as claimed in claim 13, configuring comprises activating a periodic connection mode and setting parameters for a frequency thereof.

* * * * *